United States Patent
Liss et al.

(10) Patent No.: US 8,842,671 B2
(45) Date of Patent: Sep. 23, 2014

(54) PACKET SWITCHING BASED ON GLOBAL IDENTIFIER

(75) Inventors: Liran Liss, Misgav Am (IL); Michael Kagan, Zichron Yaakov (IL); Diego Crupnicoff, Buenos Aires (AR)

(73) Assignee: Mellanox Technologies Ltd., Yokneam (IL)

( * ) Notice: Subject to any disclaimer, the term of this patent is extended or adjusted under 35 U.S.C. 154(b) by 776 days.

(21) Appl. No.: 13/154,458

(22) Filed: Jun. 7, 2011

(65) Prior Publication Data

US 2012/0314706 A1 Dec. 13, 2012

(51) Int. Cl.
 *H04L 12/28* (2006.01)
 *H04J 3/24* (2006.01)
 *G06F 15/173* (2006.01)
 *G06F 15/16* (2006.01)
 *H04L 12/931* (2013.01)

(52) U.S. Cl.
 CPC ............ *H04L 49/602* (2013.01); *H04L 49/358* (2013.01)
 USPC ........... 370/392; 370/401; 370/474; 709/238; 709/245

(58) Field of Classification Search
 None
 See application file for complete search history.

(56) References Cited

U.S. PATENT DOCUMENTS

| | | | | |
|---|---|---|---|---|
| 5,856,974 A | * | 1/1999 | Gervais et al. | 370/392 |
| 6,658,521 B1 | * | 12/2003 | Biran et al. | 710/315 |
| 6,934,710 B1 | * | 8/2005 | Mills | 1/1 |
| 7,401,157 B2 | * | 7/2008 | Costantino et al. | 709/238 |
| 7,706,374 B2 | * | 4/2010 | Huang | 370/392 |
| 2004/0022245 A1 | * | 2/2004 | Forbes et al. | 370/392 |
| 2004/0083306 A1 | * | 4/2004 | Gloe | 709/245 |

OTHER PUBLICATIONS

Infiniband Trade Association, "InfiniBandTM Architecture Specification vol. 1", Release 1.2.1, Nov. 2007.

* cited by examiner

*Primary Examiner* — Melanie Jagannathan
(74) *Attorney, Agent, or Firm* — D. Klinger IP Services Ltd.

(57) ABSTRACT

A communication method in a network operating in accordance with a standard that allocates a given number of bits m for layer-2 addressing of nodes in the network. The method includes accepting at a layer-2 switch in the network an assignment to one or more nodes in the network of respective layer-2 extended addresses, each including n=m+k bits, k>0. A given data packet is received at the switch for forwarding. The given data packet includes a layer-2 destination address and a layer-3 destination address in accordance with the standard. The layer-3 destination address includes t bits, t≥k. The given data packet is forwarded from the switch to one of the nodes by reading from the given data packet and combining the layer-2 destination address and k bits from the layer-3 destination address so as to reconstruct the n bits of the extended layer-2 address of the one of the nodes.

21 Claims, 5 Drawing Sheets

PACKET SWITCHING BASED ON GLOBAL IDENTIFIER

FIELD OF THE INVENTION

The present invention relates generally to communication networks, and particularly to methods and systems for packet switching.

BACKGROUND OF THE INVENTION

Some computer networks, such as High-Performance Computing (HPC) networks and data centers, comprise multiple nodes that communicate using the Infiniband™ protocol. Infiniband is described, for example, in "Infiniband™ Architecture Specification—Volume 1," release 1.2.1, November, 2007, which is incorporated herein by reference. Chapter 5 of this specification defines data packet formats for Infiniband networks.

SUMMARY OF THE INVENTION

An embodiment of the present invention that is described herein provides a method for communication in a network operating in accordance with a standard that allocates a given number of bits m for layer-2 addressing of nodes in the network. The method includes accepting at a layer-2 switch in the network an assignment to one or more nodes in the network of respective layer-2 extended addresses, each including $n=m+k$ bits, $k>0$. A given data packet is received at the switch for forwarding. The given data packet includes a layer-2 destination address and a layer-3 destination address in accordance with the standard. The layer-3 destination address includes t bits, The given data packet is forwarded from the switch to one of the nodes by reading from the given data packet and combining the layer-2 destination address and k bits from the layer-3 destination address so as to reconstruct the n bits of the extended layer-2 address of the one of the nodes.

In some embodiments, the standard includes an Infiniband standard, the layer-2 destination address includes a Destination Local Identifier (DLID), and the layer-3 destination address includes a Destination Global Identifier (DGID). In an embodiment, the method includes receiving at the switch an additional data packet, which is to be forwarded to an additional node in the same subnet as the one of the nodes, such that the additional data packet includes the same layer-2 destination address as the given data packet but differs from the given data packet in at least one of the k bits of the layer-3 destination address, and forwarding the additional data packet based on the layer-2 destination address and the k bits of the layer-3 destination address of the additional data packet.

In a disclosed embodiment, the method includes defining in the switch, individually for each layer-2 destination address, whether the layer-2 destination address supports layer-2 forwarding using the n bits of the extended layer-2 address. The method may include forwarding an input data packet by: (i) when the input data packet supports forwarding using the n bits, forwarding the input data packet based on the n bits of the extended layer-2 address; and (ii) when the input data packet does not support forwarding using the n bits, forwarding the input data packet based on the m bits of the layer-2 destination address.

In another embodiment, the layer-3 destination address includes a subnet prefix that identifies a subnet to which the one of the nodes belongs, and an interface identifier that identifies the one of the nodes within the subnet, and the k bits are read from the interface identifier. In an embodiment, the one of the nodes includes a virtual node. In an embodiment, the layer-2 switch includes a virtual switch. In an embodiment, the layer-2 destination address and the layer-3 destination address of the given data packet comprise multicast addresses, such that the given data packet is addressed to multiple nodes in the network.

There is additionally provided, in accordance with an embodiment of the present invention, a layer-2 network switch including one or more ports and circuitry. The ports are configured for communicating with a network operating in accordance with a standard that allocates a given number of bits m for layer-2 addressing of nodes in the network. The circuitry is configured to accept an assignment to one or more nodes in the network of respective extended layer-2 addresses, each including $n=m+k$ bits, $k>0$, to receive via one of the ports a given data packet for forwarding, the given data packet including a layer-2 destination address and a layer-3 destination address in accordance with the standard, the layer-3 destination address including t bits, $t \geq k$, and to forward the given data packet from the switch to one of the nodes by reading from the given data packet and combining the layer-2 destination address and k bits from the layer-3 destination address so as to reconstruct the n bits of the extended layer-2 address of the one of the nodes.

There is also provided, in accordance with an embodiment of the present invention, a network interface including one or more ports and a virtual layer-2 network switch. The ports are configured for communicating with a network operating in accordance with a standard that allocates a given number of bits m for layer-2 addressing of nodes in the network. The switch is configured to accept an assignment to one or more nodes in the network of respective extended layer-2 addresses, each including $n=m+k$ bits, $k>0$, to receive via one of the ports a given data packet for forwarding, the given data packet including a layer-2 destination address and a layer-3 destination address in accordance with the standard, the layer-3 destination address including t bits, $t \geq k$, and to forward the given data packet from the switch to one of the nodes by reading from the given data packet and combining the layer-2 destination address and k bits from the layer-3 destination address so as to reconstruct the n bits of the extended layer-2 address of the one of the nodes.

The present invention will be more fully understood from the following detailed description of the embodiments thereof, taken together with the drawings in which:

DETAILED DESCRIPTION OF EMBODIMENTS

Overview

Figure 1:
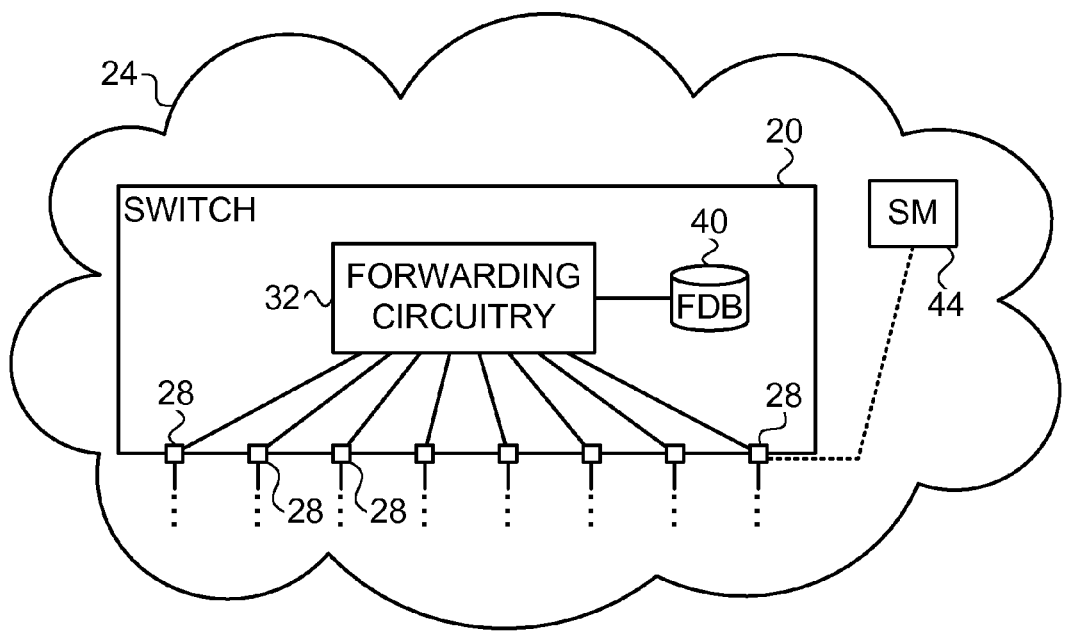
FIG. 1 is a block diagram that schematically illustrates a network switch that uses extended layer-2 addressing, in accordance with an embodiment of the present invention.

The Infiniband standard specifies data packet formats having a layer-2 header that is referred to as a Local Routing Header (LRH), and a layer-3 header that is referred to as a Global Routing Header (GRH). Typically, the LRH is used for layer-2 forwarding of packets within a given Infiniband subnet, while the GRH is used for layer-3 routing across the network. The LRH contains a 16-bit Destination Local Identifier (DLID) that identifies the desired destination node within the subnet.

In the description that follows, nodes and Host Channel Adapters (HCA) are referred to interchangeably, although nodes may also comprise switches or other network elements. The terms "layer 2" and "layer 3" refer generally to the Data Link layer and the Network layer, respectively, in accordance with the Open Systems Interconnection (OSI) model.

In some applications, the number of addressable entities in a subnet may exceed the address space enabled by the 16-bit DLID. Typically, a quarter of the addresses are reserved for multicast routing, permitting a maximum of 48K addressable entities per subnet. Some applications require a larger number of layer-2 addresses per subnet, for example when using virtualization schemes in which a single physical node often uses multiple addresses.

Embodiments of the present invention that are described herein provide methods and systems that extend the address space available for layer-2 forwarding. The disclosed techniques assign at least some of the nodes extended layer-2 addresses. When sending data packets to these nodes, the extended layer-2 destination address is specified in the packets using one or more bits of the DGID in addition to the DLID. Layer-2 switches that support these techniques forward data packets using this extended layer-2 destination address.

The extended layer-2 addressing schemes described herein enable a network operator to define and manage large Infiniband subnets, beyond the 48K addresses enabled by legacy DLID-based layer-2 forwarding. This capability is provided while preserving the existing Infiniband subnet management practices. Although it is possible in principle to increase the number of nodes per subnet using routers, such a solution introduces additional network elements, involves additional administrative overhead and complicates subnet management. Embodiments of the present invention obviate the need for such routers.

In some embodiments that are described in detail below, the capability of supporting the extended layer-2 addressing is configured per LID, enabling legacy Infiniband switches to coexist with switches that support the disclosed techniques. Moreover, the disclosed techniques do not require changes in the HCAs. Several example network configurations are described below, including heterogeneous configurations that include legacy switches and configurations including virtual switches and nodes.

Although the embodiments described herein refer mainly to Infiniband networks, the methods and systems described herein can be used with other suitable network types that use layer-2 and layer-3 destination routing.

System Description

FIG. 1 is a block diagram that schematically illustrates a network switch 20 in a packet communication network 24, in accordance with an embodiment of the present invention. In the present example network 24 comprises an Infiniband™ network. In alternative embodiments, however, switch 20 and network 24 may operate in accordance with various other suitable network standards. Switch 20 is configured to carry out layer-2 forwarding using extended layer-2 addresses, as will be explained in detail below.

Switch 20 comprises multiple ports 28, and circuitry that forwards packets between the ports. In the present example, the circuitry comprises forwarding circuitry 32 and a Forwarding Database (FDB) 40. Ports 28 connect switch 20 to network nodes (typically HCAs of client computers), to other switches, routers and/or other network elements (not shown) over network links.

Forwarding circuitry 32 is typically configured to set up suitable forwarding paths between ports 28, such that each ingress packet accepted at a certain port is forwarded to an appropriate port for egress. In the embodiments described herein, each port serves both as an input port that accepts packets from the network, and as an output port that sends packets to the network.

FDB 40 is typically implemented using a suitable memory, such as Random Access Memory (RAM) or non-volatile memory such as Flash. FDB 40 typically holds one or more tables that define how packets are to be forwarded by forwarding circuitry 32. The content and use of FDB 40 is explained and demonstrated further below. Forwarding circuitry 32 typically queries the information in FDB 40 in order to determine the output port for each packet.

In network 24, each node (not shown) belongs to a certain Infiniband subnet. Each subnet comprises a Subnet Manager (SM) 44 that configures and manages the subnet, e.g., assigns Local Identifiers (LIDs) to the various network nodes and configures the FDBs of the subnet switches. The SM of a given subnet can be implemented in any suitable element of the subnet, such as in one of the nodes or as an embedded software module within a switch. In some embodiments of the present invention, SM 44 discovers which network switches support the extended layer-2 addressing schemes described herein, and assigns extended LIDs to nodes accordingly. Typically, switch 20 communicates with SM 44 inband, i.e., via one of ports 28.

Layer-2 Packet Forwarding Based On DGID

Figure 2:
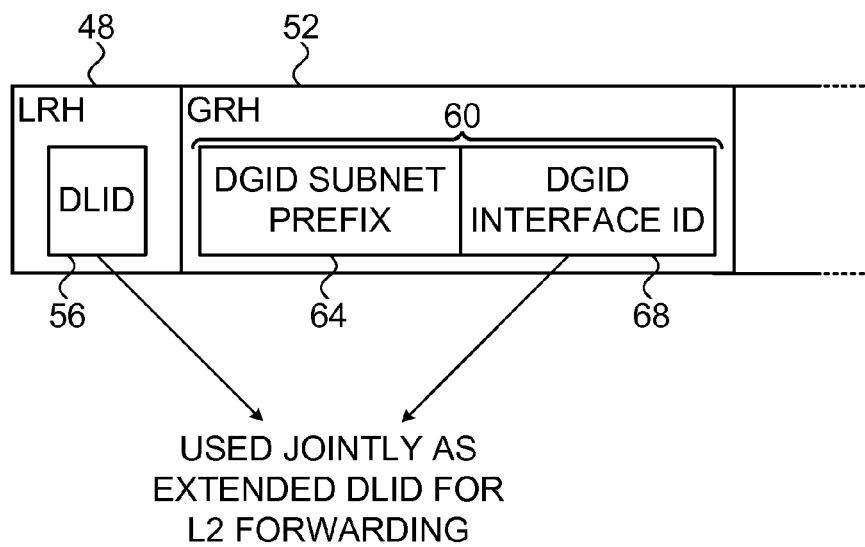
FIG. 2 is a diagram that schematically illustrates an Infiniband data packet, which is used for extended layer-2 addressing in accordance with an embodiment of the present invention.

FIG. 2 is a diagram that schematically illustrates an Infiniband data packet, which is used for extended layer-2 addressing in accordance with an embodiment of the present invention. The data packet comprises a Local Routing Header (LRH) 48 and a Global Routing Header (GRH) 52. Other packet elements, such as data payload and Cyclic Redundancy Check (CRC), are omitted from the figure for the sake of clarity.

The LRH of the data packet comprises a 16-bit Destination Local Identifier (DLID) 56, and the GRH of the packet comprises a 128-bit Destination Global Identifier (DGID) 60. In accordance with the Infiniband standard, each of the DLID and the DGID specifies the destination node, i.e., the node to which the packet is addressed. The DGID is used by network routers for layer-routing, whereas the DLID is used for layer-2 forwarding within the subnet to which the destination node belongs. DGID 60 comprises two parts: A subnet prefix 64 that specifies the subnet, and an interface ID 68 that specifies the particular HCA within the subnet to which the packet is addressed.

In some embodiments, at least some of the nodes in network 24 are reachable by extended layer-2 addresses having more than sixteen bits. Thus, packets sent to these nodes must include a GRH, although the GRH is generally optional within a subnet. The extended layer-2 address of such packets is comprised of the sixteen bits of DLID 56 plus one or more bits out of interface ID 68. One or more of the switches in network 24, e.g., switch 20, use this extended destination address for layer-2 forwarding of the packets.

Generally, let m denote the number of bits used by the applicable standard to represent layer-2 addresses (m=16 in the case of DLID). Let t denote the number of bits used by the applicable standard to represent layer-3 addresses (t=128 in the case of DGID). In some embodiments, at least some of the network nodes are assigned extended layer-2 addresses having n=m+k bits, k>0. When sending data packets to these nodes, the n-bit extended layer-2 destination address is expressed in the packets using the m bits that are conventionally used for the layer-2 destination address, plus k bits out of the t bits that are used for the layer-3 destination address (t≥k). The n-bit extended layer-2 destination address is used by one or more of the network switches for performing layer-2 forwarding of the packets. In an example embodiment, all the bits of interface ID 68 are used for extending the layer-2 address. Alternatively, however, any desired number of bits can be used.

Assignment of extended layer-2 addresses to nodes, and configuration of HCAs and switch FDBs according to these addresses, is typically performed by SM 44. In some embodiments, SM 44 automatically discovers which of the network switches support extended layer-2 addressing, and configures the HCAs and FDBs accordingly. No change is needed in legacy HCAs to support this scheme, since the DLID and DGID structure remains the same. Legacy switches that do not support extended layer-2 addressing can be supported with no change.

Note that when implementing the disclosed technique, SM 44 may assign two or more nodes the same DLID, even though they belong to the same subnet. The distinction between such nodes is made in the additional bits of the DGID that participate in the extended layer-2 destination address.

In some embodiments, a network 24 may comprise one or more switches that support the disclosed extended layer-2 addressing, as well as one or more legacy switches that do not support this scheme. For example, an optional capability denoted by GIDForwardingSupported may be added to the switch capabilities, in order to identify which switches support the disclosed techniques.

In some embodiments, support of the extended layer-2 addressing is configured on per LID. Thus, some nodes in network 24 may be reached using this scheme while other nodes may not. In a typical embodiment, nodes that are reachable via one or more switches that support the extended layer-2 addressing, may be reached using data packets that include a GRH in accordance with the disclosed schemes. Nodes that are reachable only via one or more legacy switches, will be reached using conventional DLID-based layer-2 forwarding.

It should be noted that the disclosed extended layer-2 forwarding schemes are distinctly different from layer-3 routing, even though they make use of the packet DGID. In the disclosed layer-2 forwarding schemes, the network switch treats the DGID (or parts thereof) as an extension to the packet DLID, effectively achieving a wider layer-2 address. Moreover, the disclosed network switches do not replace the layer-2 address, as is often done in layer-3 forwarding, and therefore the layer-2 address remains an end-to-end notion. The disclosed layer-2 forwarding schemes are typically implemented as an integral part of subnet management, without involving any layer-3 administrative actions.

Furthermore, the disclosed DGID-based layer-2 forwarding schemes coexist with layer-3 routers: The disclosed layer-2 forwarding schemes use the existing GID as-is, while making layer-2 forwarding decisions within the subnet. In particular, subnet prefix 64 of the DGID, which is used by layer-3 routers for inter-subnet layer-3 forwarding, is ignored for the purposes of layer-2 forwarding. The subnet prefix is typically assumed to be constant within a given layer-2 subnet.

Figure 3:
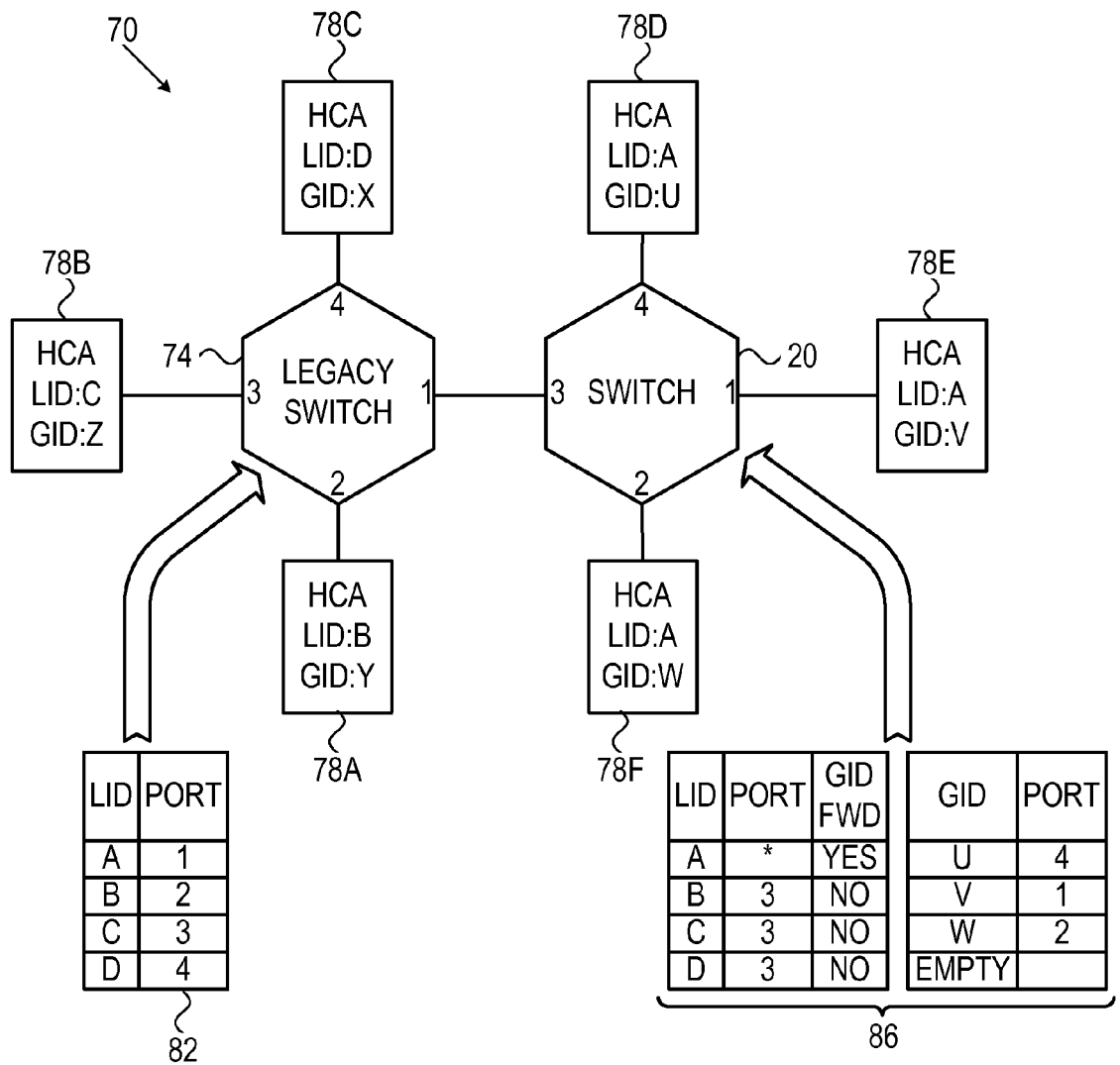
FIG. 3 is a block diagram that schematically illustrates an Infiniband network and associated Forwarding Databases (FDB), in accordance with an embodiment of the present invention.

FIG. 3 is a block diagram that schematically illustrates an Infiniband network 70, in accordance with an embodiment of the present invention. This example demonstrates how the disclosed techniques enable the use of both extended and legacy layer-2 addressing schemes in the same network. Network 70 comprises six nodes (HCAs) 78A . . . 78F. The LIDs and GIDs that are assigned to the various nodes are marked in the figure. Network 70 further comprises switch 20 that supports the disclosed techniques, and a legacy switch 74. Each of the switches has four ports denoted 1 . . . 4.

The three nodes that are reachable via switch 20, namely nodes 78D . . . 78F, are assigned by SM 44 a single LID, LID=A. These three nodes are assigned different GIDs, namely GID=U, V, W, respectively. The three nodes that are reachable via legacy switch 74, namely nodes 78A . . . 78C, are assigned different and unique LIDs and different and unique GIDs.

The FDB of legacy switch 74 holds a table 82, which is configured by SM 44 and defines the output port via which each LID is reachable. In accordance with table 82, switch 74 will forward any packet having LID=A to port 1. This LID is assigned to nodes 78D . . . 78F, which are indeed reachable via port 1 of switch 74. According to the table, switch 74 will forward packets having LID=B via port 2, packets having LID=C via port 3, and packets having LID=D via port 4. These FDB entries match the LIDs assigned to nodes 78A . . . 78C.

Packets forwarded from legacy switch 74 to switch 20 are forwarded to the appropriate nodes using the extended layer-2 forwarding scheme, i.e., based jointly on their respective DLID and DGID. Switch 20 is configured to use a single LID, LID=A, for all the nodes that are behind it (nodes 78D . . . 78F). In some embodiments, FDB 40 of switch 20 holds a pair of tables 86 that are configured by SM 44. The left-hand side table indicates the output port via which each LID is reachable, and also which LID is configured for extended (DLID+DGID) layer-2 forwarding.

In the present example, only LID=A is marked as configured for extended layer-2 forwarding. LIDs B, C and D are all reachable over port 3 of switch 20. The right hand side table in pair 86 indicates the output port via which each GID is reachable when using the extended layer-2 forwarding (using the shared LID, LID=A). In the present example, GIDs U, V and W are reachable via port 4, 1 and 2, respectively.

For example, node 78B sends a data packet to node 78E by sending the packet with DLID=A and DGID=V. Such a packet is forwarded by legacy switch 74 over its port 1 to switch 20, according to the FDB entry of DLID=A in table 82. Switch 20 forwards the packet over its port 1 to node 78E, in accordance with the FDB entry for DGID=V in tables 86.

Figure 4:
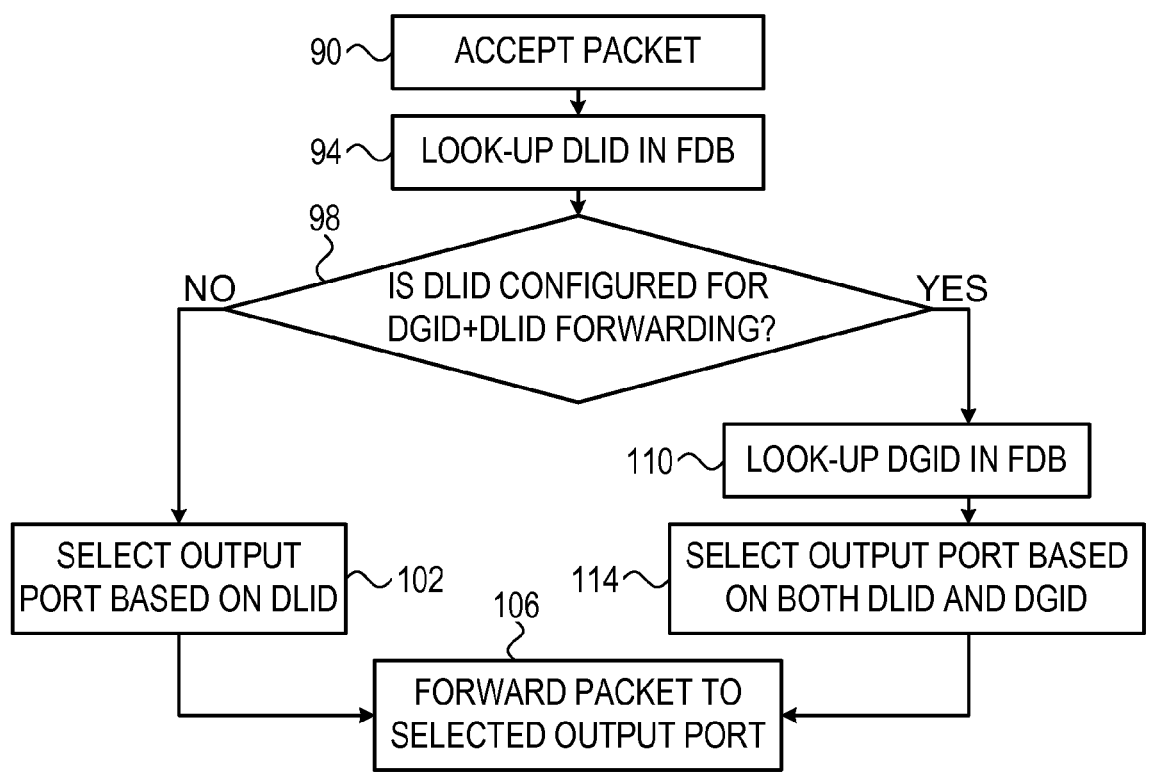
FIG. 4 is a flow chart that schematically illustrates a method for packet forwarding, in accordance with an embodiment of the present invention.

FIG. 4 is a flow chart that schematically illustrates an example method for packet forwarding, in accordance with an embodiment of the present invention. The method begins with switch 20 accepting a data packet via one of ports 28, at a packet input step 90. Forwarding circuitry 32 in switch 20 looks-up the entry in FDB 40 that corresponds to the DLID of the data packet, at a DLID lookup step 94. Based on this FDB entry, the forwarding circuitry checks whether the DLID of the data packet is configured for extended layer-2 forwarding, i.e., for forwarding based on both DLID and DGID, at a checking step 98.

If not, i.e., if the DLID of the data packet indicates that the packet is to be forwarded using conventional DLID-based forwarding, forwarding circuitry 32 selects an output port over which to forward the data packet based on the packet DLID alone, at a DLID-based port selection step 102. The selected output port is specified in the FDB entry corresponding to the packet DLID.

If, on the other hand, the DLID of the data packet indicates that the packet is to be forwarded using extended layer-2 forwarding, forwarding circuitry 32 looks-up the FDB entry that corresponds to the DGID of the data packet, at a DGID lookup step 110. The forwarding circuitry selects the output port for the data packet based on the extended layer-2 destination address of the packet, at a DGID-based port selection step 114. As explained above, the extended layer-2 destination address is made-up of the packet DLID plus one or more bits of the packet DGID. The selected output port is specified in the FDB entry corresponding to the packet DGID.

After selecting the output port and configuring forwarding circuitry 32 accordingly, the forwarding circuitry forwards the data packet from the port over which it arrived to the selected output port, at a forwarding step 106.

Additional Example Network Configurations

Figure 5:
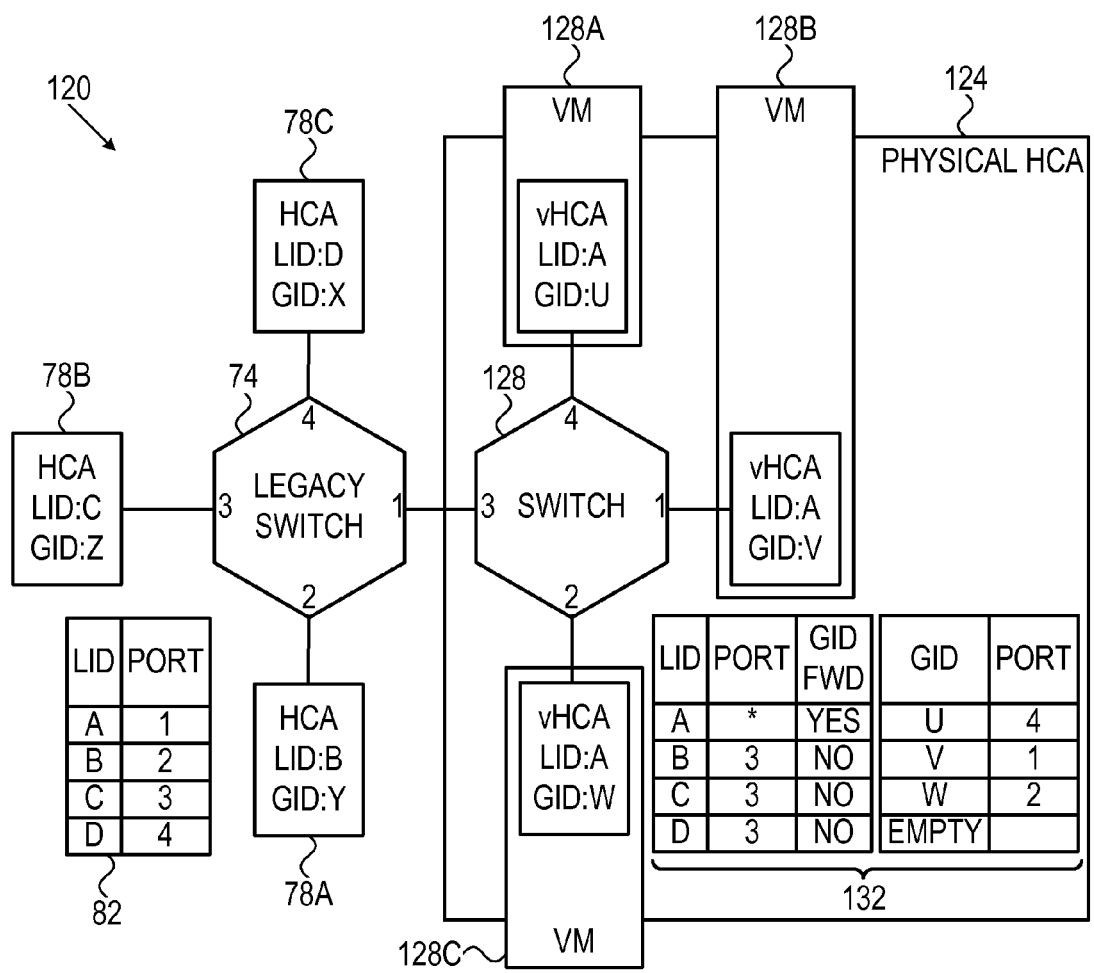
FIG. 5 is a block diagram that schematically illustrates an Infiniband network that uses virtual switches and virtual machines, in accordance with an embodiment of the present invention.

FIG. 5 is a block diagram that schematically illustrates an Infiniband network 120, in accordance with an alternative embodiment of the present invention. This network configuration demonstrates how the disclosed techniques can be used in conjunction with node and switch virtualization. In the example of FIG. 5, legacy switch 74 connects physical nodes (physical HCAs) 78A . . . 78C and 124.

Physical HCA 124 comprises a physical port for connecting to the network, three Virtual HCAs (vHCA), and a virtual network switch 128, which has four virtual ports denoted 1 . . . 4. The vHCAs are assigned to Virtual Machines (VMs) 128A . . . 128C, which are hosted by the machine that Physical HCA 124 is installed on. The FDB of virtual switch 128 comprises tables 132. The network configuration of FIG. 5 is parallel to the network configuration of FIG. 3 above with regard to topology, address assignments and FDB configuration, with VMs 128A . . . 128C of FIG. 5 corresponding to physical nodes 78D . . . 78F of FIG. 3, respectively, and with virtual switch 128 of FIG. 5 corresponding to physical switch 20 of FIG. 3.

In this virtualized network too, conventional and extended layer-2 forwarding schemes may coexist, as explained above. In other words, in some embodiments the disclosed techniques are carried out in a virtual switch having virtual ports. Using the disclosed techniques is advantageous in virtualized networks, since a given physical node (HCA 124 in this case) can be assigned multiple extended LIDs without exhausting the available LID address space.

Figure 6:
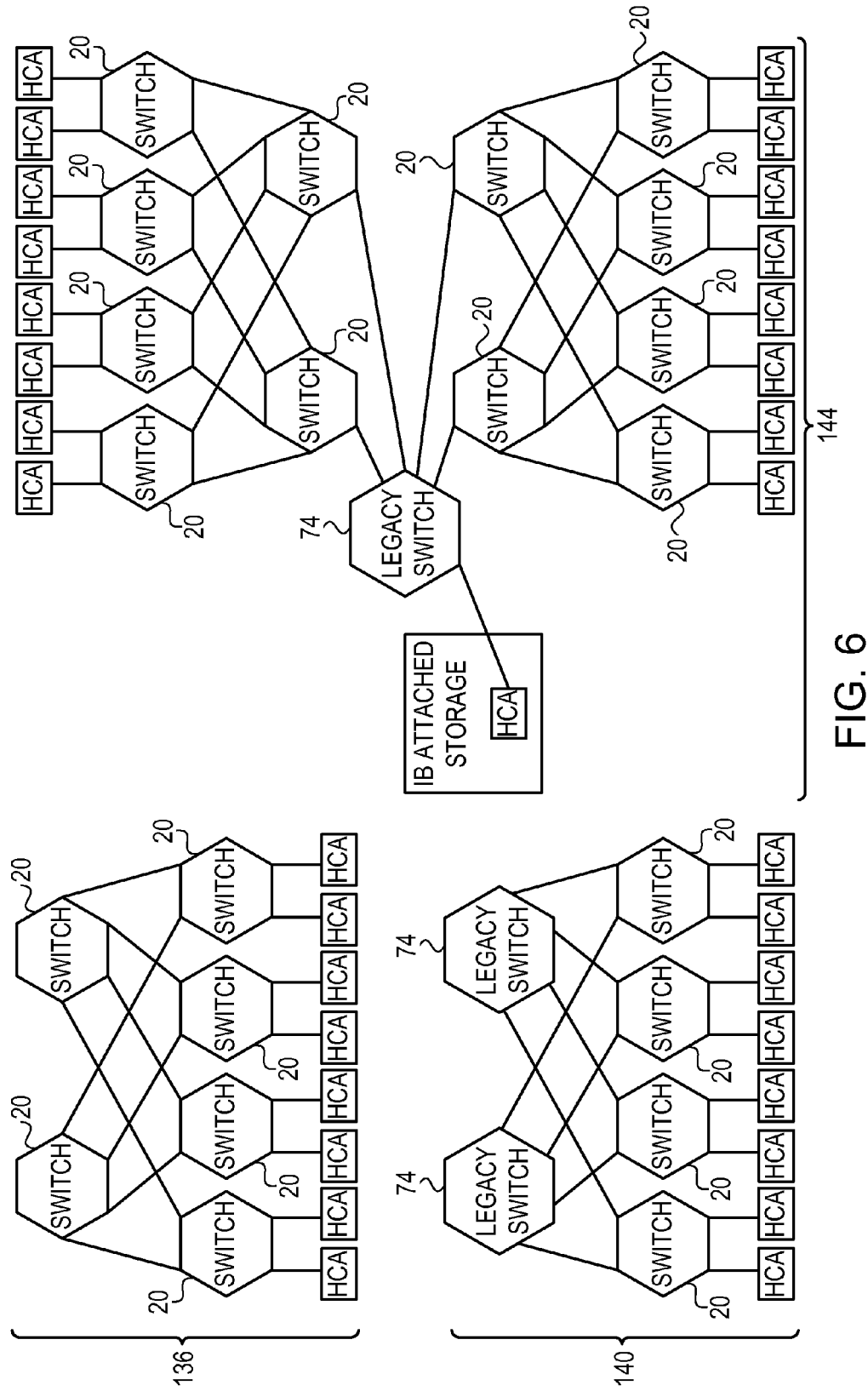
FIG. 6 shows block diagrams of example network configurations, in accordance with embodiments of the present invention.

FIG. 6 shows block diagrams of example network configurations 136, 140 and 144, in accordance with embodiments of the present invention. The examples of FIG. 6 can be used, for example, in High-Performance Computing (HPC) applications.

In network 136, multiple HCAs are connected exclusively by switches 20 that support extended layer-2 addressing, in a Fat-Tree topology. In network 140 the HCAs are also connected in a Fat-Tree topology. In this embodiment, however, the leaf switches that connect to the HCAs comprise switches 20 that support extended layer-2 addressing, while the spine switches of the Fat-Tree topology comprise legacy switches 74. Network 144 demonstrates a cluster of HCAs, connected by switches 20 that support extended layer-2 addressing, that interoperate with legacy equipment (in this embodiment an Infiniband-attached storage device).

The configurations of switches 20 and 138 and HCA 124 shown in FIGS. 1 and 5 are example configurations, which are chosen purely for the sake of conceptual clarity. In alternative embodiments, any other suitable switch and HCA configuration can be used. The various elements of the switches can be implemented using hardware, e.g., using one or more Application-Specific Integrated Circuits (ASICs) or Field-Programmable Gate Arrays (FPGAs). Alternatively, some or all the elements of the switches may be implemented in software, or using a combination of hardware and software elements.

In some embodiments, some of the functions of forwarding circuitry 32 and/or some of the functions of virtual switch 128 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The network configurations of FIGS. 3, 5 and 6 are example configurations, which are shown purely for the sake of conceptual clarity. In alternative embodiments, any other suitable network configuration can be used.

Although the embodiments described herein refer mainly to data packets that are addressed to a specific node (sometimes referred to as unicast packets), the disclosed techniques are also applicable to data packets that are addressed to multiple nodes, e.g., multicast packets.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication in a network operating in accordance with a standard that allocates a given number of bits m for layer-2 addressing of nodes in the network, the method comprising:

accepting at a layer-2 switch in the network an assignment to one or more nodes in the network of respective layer-2 extended addresses, each comprising $n=m+k$ bits, $k>0$;

receiving at the switch a given data packet for forwarding, the given data packet comprising a layer-2 destination address and a layer-3 destination address in accordance with the standard, the layer-3 destination address comprising t bits, t≥k; and forwarding the given data packet from the switch to one of the nodes by reading from the given data packet and combining the layer-2 destination address and k bits from the layer-3 destination address so as to reconstruct the n bits of the extended layer-2 address of the one of the nodes.

2. The method according to claim 1, wherein the standard comprises an Infiniband standard, wherein the layer-2 destination address comprises a Destination Local Identifier (DLID), and wherein the layer-3 destination address comprises a Destination Global Identifier (DGID).

3. The method according to claim 1, and comprising receiving at the switch an additional data packet, which is to be forwarded to an additional node in the same subnet as the one of the nodes, wherein the additional data packet comprises the same layer-2 destination address as the given data packet but differs from the given data packet in at least one of the k bits of the layer-3 destination address, and forwarding the additional data packet based on the layer-2 destination address and the k bits of the layer-3 destination address of the additional data packet.

4. The method according to claim 1, and comprising defining in the switch, individually for each layer-2 destination address, whether the layer-2 destination address supports layer-2 forwarding using the n bits of the extended layer-2 address.

5. The method according to claim 4, and comprising forwarding an input data packet by:
when the input data packet supports forwarding using the n bits, forwarding the input data packet based on the n bits of the extended layer-2 address; and
when the input data packet does not support forwarding using the n bits, forwarding the input data packet based on the m bits of the layer-2 destination address.

6. The method according to claim 1, wherein the layer-3 destination address comprises a subnet prefix that identifies a subnet to which the one of the nodes belongs, and an interface identifier that identifies the one of the nodes within the subnet, and wherein the k bits are read from the interface identifier.

7. The method according to claim 1, wherein the one of the nodes comprises a virtual node.

8. The method according to claim 1, wherein the layer-2 switch comprises a virtual switch.

9. The method according to claim 1, wherein the layer-2 destination address and the layer-3 destination address of the given data packet comprise multicast addresses, such that the given data packet is addressed to multiple nodes in the network.

10. A layer-2 network switch, comprising:
one or more ports for communicating with a network operating in accordance with a standard that allocates a given number of bits m for layer-2 addressing of nodes in the network; and
circuitry, which is configured to accept an assignment to one or more nodes in the network of respective extended layer-2 addresses, each comprising n=m+k bits, k>0, to receive via one of the ports a given data packet for forwarding, the given data packet comprising a layer-2 destination address and a layer-3 destination address in accordance with the standard, the layer-3 destination address comprising t bits, t≥k, and to forward the given data packet from the switch to one of the nodes by reading from the given data packet and combining the layer-2 destination address and k bits from the layer-3 destination address so as to reconstruct the n bits of the extended layer-2 address of the one of the nodes.

11. The switch according to claim 10, wherein the standard comprises an Infiniband standard, wherein the layer-2 destination address comprises a Destination Local Identifier (DLID), and wherein the layer-3 destination address comprises a Destination Global Identifier (DGID).

12. The switch according to claim 10, wherein the circuitry is configured to receive an additional data packet, which is to be forwarded to an additional node in the same subnet as the one of the nodes, wherein the additional data packet comprises the same layer-2 destination address as the given data packet but differs from the given data packet in at least one of the k bits of the layer-3 destination address, and to forward the additional data packet based on the layer-2 destination address and the k bits of the layer-3 destination address of the additional data packet.

13. The switch according to claim 10, wherein the circuitry is configured to hold a definition, individually for each layer-2 destination address, whether the layer-2 destination address supports layer-2 forwarding using the n bits of the extended layer-2 address.

14. The switch according to claim 13, wherein the circuitry is configured to forward an input data packet by:
when the input data packet supports forwarding using the n bits, forwarding the input data packet based on the n bits of the extended layer-2 address; and
when the input data packet does not support forwarding using the n bits, forwarding the input data packet based on the m bits of the layer-2 destination address.

15. The switch according to claim 10, wherein the layer-destination address comprises a subnet prefix that identifies a subnet to which the one of the nodes belongs, and an interface identifier that identifies the one of the nodes within the subnet, and wherein the circuitry is configured to read the k bits from the interface identifier.

16. The switch according to claim 10, wherein the one of the nodes comprises a virtual node.

17. The switch according to claim 10, wherein the ports comprise virtual ports.

18. The switch according to claim 10, wherein the layer-2 destination address and the layer-3 destination address of the given data packet comprise multicast addresses, such that the given data packet is addressed to multiple nodes in the network.

19. A network interface, comprising:
one or more ports for communicating with a network operating in accordance with a standard that allocates a given number of bits m for layer-2 addressing of nodes in the network; and
a virtual layer-2 network switch configured to accept an assignment to one or more nodes in the network of respective extended layer-2 addresses, each comprising n=m+k bits, k>0, to receive via one of the ports a given data packet for forwarding, the given data packet comprising a layer-2 destination address and a layer-3 destination address in accordance with the standard, the layer-3 destination address comprising t bits, t≥k, and to forward the given data packet from the switch to one of the nodes by reading from the given data packet and combining the layer-2 destination address and k bits from the layer-3 destination address so as to reconstruct the n bits of the extended layer-2 address of the one of the nodes.

20. The network interface according to claim 19, wherein the standard comprises an Infiniband standard, wherein the layer-2 destination address comprises a Destination Local Identifier (DLID), and wherein the layer-3 destination address comprises a Destination Global Identifier (DGID).

21. The network interface according to claim 19, wherein the virtual switch holds a definition, individually for each layer-2 destination address, whether the layer-2 destination address supports layer-2 forwarding using the n bits of the extended layer-2 address.

* * * * *